US010226651B2

(12) United States Patent
Raimarckers et al.

(10) Patent No.: US 10,226,651 B2
(45) Date of Patent: Mar. 12, 2019

(54) TEST CELL FOR AN AIRCRAFT TURBINE ENGINE

(71) Applicant: Safran Aero Boosters SA, Herstal (Milmort) (BE)

(72) Inventors: Nicolas Raimarckers, Tourinne (BE); Gaetano Taccogna, Bassenge (BE)

(73) Assignee: Safran Aero Boosters SA (BE)

( * ) Notice: Subject to any disclaimer, the term of this patent is extended or adjusted under 35 U.S.C. 154(b) by 136 days.

(21) Appl. No.: 15/415,939

(22) Filed: Jan. 26, 2017

(65) Prior Publication Data
US 2017/0216637 A1 Aug. 3, 2017

(30) Foreign Application Priority Data
Jan. 28, 2016 (BE) .................................. 2016/5072

(51) Int. Cl.
| | |
|---|---|
| *G01M 15/14* | (2006.01) |
| *A62C 2/14* | (2006.01) |
| *A62C 2/24* | (2006.01) |
| *A62C 3/00* | (2006.01) |
| *A62C 35/00* | (2006.01) |
| *E06B 9/04* | (2006.01) |
| *F02C 7/25* | (2006.01) |
| *G01M 15/02* | (2006.01) |
| *F01D 25/28* | (2006.01) |
| *G01M 9/04* | (2006.01) |
| *A62C 99/00* | (2010.01) |
| *A62C 3/08* | (2006.01) |

(52) U.S. Cl.
CPC .................. *A62C 2/14* (2013.01); *A62C 2/24* (2013.01); *A62C 3/00* (2013.01); *A62C 35/00* (2013.01); *E06B 9/04* (2013.01); *F01D 25/285* (2013.01); *F02C 7/25* (2013.01); *G01M 9/04* (2013.01); *G01M 15/02* (2013.01); *G01M 15/14* (2013.01); *A62C 3/08* (2013.01); *A62C 99/0018* (2013.01); *F05D 2220/323* (2013.01); *F05D 2260/12* (2013.01)

(58) Field of Classification Search
USPC ....................................................... 73/112.01
See application file for complete search history.

(56) References Cited

U.S. PATENT DOCUMENTS

| | | | | |
|---|---|---|---|---|
| 5,092,525 A | * | 3/1992 | Roach ..................... | F02K 1/625 239/265.29 |
| 5,293,775 A | * | 3/1994 | Clark ....................... | F02C 7/04 73/116.03 |
| 5,377,534 A | * | 1/1995 | Boet ........................ | B64F 1/26 181/203 |

(Continued)

*Primary Examiner* — Eric S. McCall
(74) *Attorney, Agent, or Firm* — Sandberg Phoenix & von Gontard, P.C.

(57) ABSTRACT

A test cell for an aircraft turbojet, wherein the test cell comprises a U-shaped configuration, with a passageway in the form of an elongated corridor, an inlet chimney, and an outlet chimney. The corridor includes a securing area with a securing arm for holding the turbojet during its test. The passageway furthermore reveals an upstream shutter and a downstream shutter, the two shutters including one pivoting flap or a series of pivoting flaps. In the event of a fire, the shutters close due to autonomous return means. Gravity allows the flap(s) to come down to the closed position and to confine the turbojet in order to rapidly stifle the fire.

15 Claims, 3 Drawing Sheets

(56) References Cited

U.S. PATENT DOCUMENTS

| | | | | |
|---|---|---|---|---|
| 5,396,793 | A * | 3/1995 | Colletti | G01L 5/133 73/116.03 |
| 5,575,607 | A * | 11/1996 | Grout | B66C 19/00 212/344 |
| 5,762,885 | A * | 6/1998 | Debbage | B01D 53/8696 422/171 |
| 5,837,890 | A * | 11/1998 | Long | F01D 25/30 73/116.03 |
| 6,237,395 | B1 * | 5/2001 | Helgeson | F01D 25/285 73/118.03 |
| 7,574,904 | B1 * | 8/2009 | Davies | G01M 15/14 73/112.01 |
| 2001/0029773 | A1 * | 10/2001 | Helgeson | F01D 25/285 73/23.31 |
| 2004/0045271 | A1 * | 3/2004 | Horner | F01D 25/30 60/39.5 |
| 2004/0216535 | A1 * | 11/2004 | Brostmeyer | G01M 15/14 73/865.6 |
| 2007/0009728 | A1 * | 1/2007 | Aoki | B64F 1/26 428/304.4 |
| 2007/0276601 | A1 * | 11/2007 | Parfitt | G01L 5/133 702/1 |
| 2011/0048847 | A1 * | 3/2011 | Helgeson | F01D 25/285 181/220 |
| 2011/0138772 | A1 | 6/2011 | Zitouni et al. | |
| 2016/0290155 | A1 * | 10/2016 | Taccogna | B64F 5/60 |
| 2017/0323484 | A1 * | 11/2017 | Colson | G01N 21/8803 |

* cited by examiner

TEST CELL FOR AN AIRCRAFT TURBINE ENGINE

CROSS-REFERENCE TO RELATED APPLICATIONS

This application claims the benefit, under 35 U.S.C. § 119, of BE 2016/5072 filed Jan. 28, 2016, the disclosure of which is incorporated herein by reference in its entirety.

FIELD

The invention relates to tests of aircraft turbine engines. More precisely, the invention concerns a test cell adapted to stifle any fire occurring in the engine. The invention furthermore proposes a method for extinguishing a fire in a test cell.

BACKGROUND

When designing or maintaining a turbine engine, such as a turbojet, different tests are performed in order to validate its correct functioning. These tests allow endurance to be checked during prolonged functioning phases by maintaining predetermined speeds, loads. During these tests, a series of measurements is taken in order to monitor key parameters. These measurements can be taken both directly on the turbine engine and/or on its environment.

In order to conduct such tests, the turbine engine is installed in a specific test cell. The latter is adapted to recreate flight conditions while remaining on the ground. Such a test cell has a corridor forming a test chamber for accommodating the turbine engine. Vertical chimneys delimit the ends of the corridor to form an inlet and an outlet. The chimneys receive then reject the flow of air propelled by the turbine engine. Devices reduce noise nuisance inherent to the functioning of the turbine engine, this noise being propagated by the chimneys.

Patent document U.S. 2011/0138772 A1 discloses a turbojet test cell making it possible to recover the kinetic energy produced by the exhaust gases from the turbojet. The test cell has a U-shaped configuration, that is to say, one that displays an inlet chimney and an outlet chimney, the chimneys being connected by a horizontal corridor containing the turbine engine.

During a test, an oil or fuel pipe can rupture. There is then a risk of an engine fire occurring. Such an event can damage the test cell, and in particular, its sensors. Inevitably, the turbine engine can also suffer severe damage. The consequences of such an incident cause heavy losses, necessitating subsequent repairs that further delay the possibility of re-using the turbine engine. This scenario becomes paradoxical in the context of an overhaul, since a test is supposed to authorize a turbine engine to fly instead of adding a wait. Heavy financial losses result from such groundings.

SUMMARY

The aim of the invention is to resolve at least one of the problems posed by the prior art. More precisely, the aim of the invention is to reduce the impact of a fire occurring in the test cell. The invention also has the further aim of providing a robust and reliable test cell.

An object of the invention is a test cell for an engine, in particular for a turbojet or turboprop able to drive an air flow, the test cell comprising an inlet, an outlet, a passageway communicating with the inlet and the outlet, the passageway being intended to accommodate the engine during the tests. In various embodiments the passageway includes at least one shutter pivoting at least between an open position and a closed position in order to cut off a circulation of air in the passageway, for example, in the event of a fire, and in various embodiments it includes a return means, energetically autonomous, the means being configured for returning the shutter towards its closed position.

According to various advantageous embodiments of the invention, the shutter includes a flap or a series of flaps configured so as to form a continuous bulkhead able to close the passageway with the shutter in the closed position.

According to various advantageous embodiments of the invention, the shutter includes at least one plate, the width of which is greater than at least ten times the thickness, or at least twenty times the thickness.

According to various advantageous embodiments of the invention, with the shutter in the open position, the flap or each flap is parallel to the main elongation of the passageway, and/or in the closed position, the flap or each flap is inclined relative to the main elongation of the passageway.

According to various advantageous embodiments of the invention, the pivot axis of the shutter is horizontal or inclined relative to the vertical direction, the shutter being balanced along its pivot axis so as to be returned towards the closed position in a gravitational manner, the shutter possibly including a ballast.

According to various advantageous embodiments of the invention, the return means comprises a pre-tensioned elastic means so as to return the shutter to the closed position.

According to various advantageous embodiments of the invention, the return means comprises a permanent magnet able to return the shutter towards the closed position and/or to hold it in the closed position.

According to various advantageous embodiments of the invention, the shutter is intended to be placed downstream or upstream of the engine.

According to various advantageous embodiments of the invention, the shutter is a first shutter; the passageway furthermore including a second shutter distanced from the first shutter in order to delimit a section of the passageway between them; the two shutters being able to cut off the circulation of air between the inlet and the outlet of the passageway so as to be able to stifle a fire in the section.

According to various advantageous embodiments of the invention, the test cell includes an inerting system able to propel an inert gas into the passageway, and/or securing means for the engine located in a securing area for the engine, the inerting system possibly being placed in the area.

According to various advantageous embodiments of the invention, the cell is a test cell for a turbojet or turboprop, intended to drive an air flow passing through the passageway, the shutter being able to be moved out of the closed position by the air flow when the air flow is greater than a threshold S, and/or the shutter is configured so as to be in the closed position when the flow is lower than or equal to the threshold S.

According to various advantageous embodiments of the invention, the shutter includes a pivot link, which is off-centre relative to the shutter; in various instances in the closed position, the shutter has an upper half and a lower half, the pivot being placed at the upper half.

According to various advantageous embodiments of the invention, in the open position, the flap or each flap is horizontal and/or lying flat.

According to various advantageous embodiments of the invention, with the engine functioning normally, the shutter is held in the open position and/or the air flow driven by the engine exerts a dynamic pressure greater than a threshold S on the shutter.

According to various advantageous embodiments of the invention, the passageway includes a corridor, intended to accommodate the engine, and/or vertical chimneys, the shutter, in various instances, being situated in the corridor.

According to various advantageous embodiments of the invention, the corridor includes securing means for the engine in a securing area for the engine, in various instances equipped with sensors.

According to various advantageous embodiments of the invention, the shutter is a first shutter situated upstream of the engine, the passageway furthermore comprising a second shutter situated downstream of the engine, the two shutters being able to cut off the circulation of air between the inlet and the outlet of the passageway so as to be able to stifle a fire occurring in the passageway at the engine.

According to various advantageous embodiments of the invention, the upstream shutter pivots to the closed position when it is exposed to a dynamic pressure P1 lower than a threshold S1, and the downstream shutter pivots to the closed position when it is exposed to a dynamic pressure lower than a threshold S2, the thresholds S1 and S2 being different.

According to various advantageous embodiments of the invention, the downstream shutter closes after the upstream shutter.

According to various advantageous embodiments of the invention, each shutter closes progressively, in particular, each flap reaches its closed position progressively, and/or the flaps of one shutter reach their closed positions one after the other.

According to various advantageous embodiments of the invention, the passageway includes an air circulating direction from the inlet towards the outlet, the main direction is, in various instances, along the centreline of the passageway.

According to various advantageous embodiments of the invention, the passageway includes concrete walls reinforced with metal mesh, and, in various instances, foundations, for example, at one shutter at least or at each shutter.

According to various advantageous embodiments of the invention, the passageway and/or the corridor measure more than 10 m in length, in various instances more than 20 m in length, for example more than 70 m in length. The length of the corridor can be measured as a straight line.

According to various advantageous embodiments of the invention, the passageway has a passageway cross section of at least 4 $m^2$, or 25 $m^2$, or 50 $m^2$, or 100 $m^2$.

According to various advantageous embodiments of the invention, the test cell includes a securing arm, in various instances a bracket or suspension post, adapted for securing the engine.

According to various advantageous embodiments of the invention, the engine is able to exert a thrust greater than or equal to 20 kN, or 80 kN, or 200 kN, or 500 kN. The securing arm being designed to pick up the corresponding loads.

According to various advantageous embodiments of the invention, the shutter or at least one shutter or each shutter is mounted to rotate freely relative to the test cell, and/or each flap is mounted to rotate freely relative to the other flaps.

According to various advantageous embodiments of the invention, the bulkhead or each bulkhead is airtight or generally airtight.

According to various advantageous embodiments of the invention, the securing area for the engine includes measurement sensors, in particular, temperature or pressure sensors or flow measurement sensors.

According to various advantageous embodiments of the invention, in the closed position, the flap or at least one flap or each flap is generally perpendicular to the main elongation of the passageway.

According to various advantageous embodiments of the invention, the test cell includes means of holding the shutter in the open position and/or means of holding the shutter in the closed position.

An object of the invention is also a test cell for an engine, in particular for a turbojet or turboprop able to drive an air flow, the test cell comprising an inlet, an outlet, a passageway communicating with the inlet and the outlet, wherein the passageway is intended to accommodate the engine during the tests. In various embodiments, the passageway includes a shutter pivoting between an open position and a closed position in order to cut off a circulation of air in the passageway, for example, in the event of a fire, the shutter is able to be returned to the closed position by action of the gravitational force and/or the shutter is able to be moved out of the closed position by an air flow driven through the passageway by the engine.

An object of the invention is also a method for extinguishing a fire in a test cell for an engine, for example, for a turbojet or turboprop. The method comprises (a) performing an engine test in the test cell; (b) detecting a fire, in various examples the cell includes a shutter pivoting between an open position and a closed position. The method furthermore comprises (d) pivoting the shutter towards the closed position in an energetically autonomous manner, in various instances the test cell conforms to the invention.

According to various advantageous embodiments of the invention, the engine is a an aircraft turbojet or turboprop, and following step (b) detecting, the engine is shut down; and during step (d) pivoting, the engine continues to turn so as to drive an air flow that holds the shutter partially open.

According to various advantageous embodiments of the invention, during step (d) pivoting, the shutter remains partially open for at least 1 second, in various instances for at least 5 seconds, for example at least 20 seconds, for example at least 1 minute.

In a general manner, the advantageous embodiments of each object of the invention are also applicable to the other objects of the invention. In so far as is possible, each object and each advantageous embodiment can be combined.

The presence of one or several pivoting flaps makes it possible to improve the compactness of the shutter and to limit its impact on the flow circulating in the test cell. In the open position, each shutter is partially, in various instances, totally enshrined in the passageway, in particular in the corridor, which makes it possible to close it even faster.

The presence of return means driving the closing of the shutter in the event of unusual functioning of the engine enables rapid, autonomous and energy-saving fire management. This furthermore improves closing reliability.

Two shutters make it possible to confine a smaller area so as to assist the asphyxiation of a fire starting there. They are located near the turbojet, which makes it possible to eliminate the oxygen remaining in the chamber that they form. The presence of an inerting system activated by closing the shutters accelerates fire management.

Due to the inertia of the rotor of an aircraft turbojet, the air flow continues to be driven in spite of cutting off the energy supply. Since the flaps remain partially open when the flow continues to circulate beyond a certain threshold, they can be dimensioned in a lighter way. In fact, they do not need to remain closed while resisting a high flow from the turbine engine. The shutter can therefore be made thinner, so that it perturbs the test minimally.

DRAWINGS

DETAILED DESCRIPTION

Figure 1:
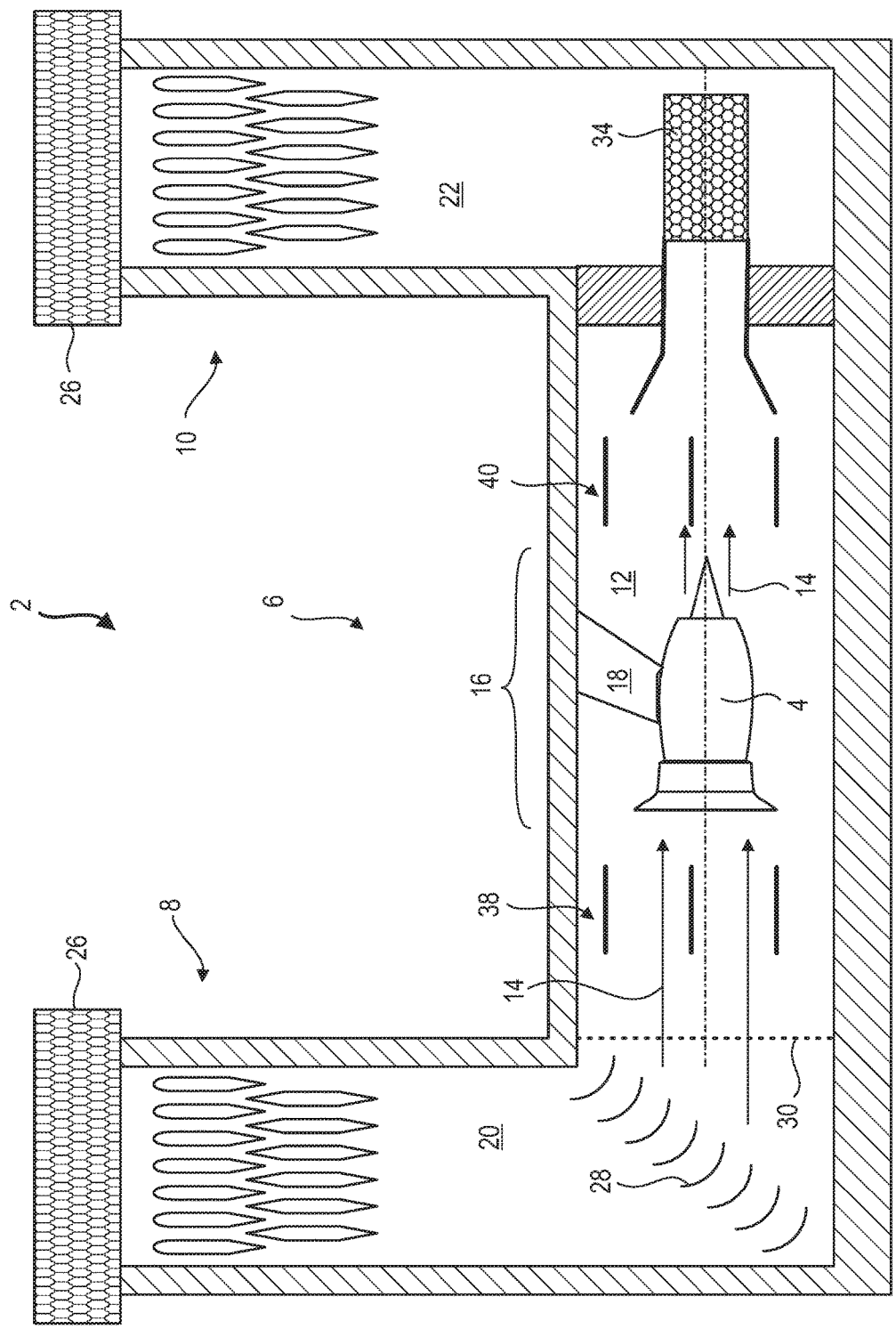
FIG. 1 shows a test cell accommodating an engine in test phase according to various embodiments of the invention.

FIG. 1 shows in a simplified manner a test cell 2 of an engine 4, for example a test cell 2 for a turbine engine 4, for example for an aircraft turbojet 4.

The test cell 2 forms an infrastructure, a construction. It comprises a passageway 6 with an inlet 8 and an outlet 10. The passageway 6 can include a corridor 12, essentially elongated. Its length can be more than 50 m. The length of the corridor 12 allows an air flow 14 to circulate in a straight line, or a circulation of air 14 passing through the passageway 6. This air flow 14 circulates through the test cell 2 because of the blow from the turbojet 4. In order to limit resistance to the flow, in particular the entry of an air flow 14 into the turbojet 4, the corridor 12 can have a passageway cross section greater than or equal to 50 m². The passageway cross section, or free section, can be measured upstream of the securing area 16 intended to accommodate the turbojet 4. The securing area 16 can be a section of the corridor 12 depending on its length. The passageway cross section can be observable over at least one quarter of the length of the corridor 12, for example over the majority of the length.

The securing area 16 is, in various instances, equipped with a securing arm 18, where the turbojet 4 is mounted. The arm 18 can extend vertically from the ceiling of the corridor 12, in the manner of a column or post. The arm 18 makes it possible to mount the turbojet 4 with an offset, and to center the latter in the middle of the corridor 12. Centering is vertical and horizontal.

The corridor 12 can be delimited by vertical chimneys (20, 22) as inlet 8 and outlet 10. They allow air to be admitted and evacuated vertically, elevated relative to the corridor 12. The U-shaped configuration detailed here is not indispensable, other configurations, for example without chimneys, can be envisioned. Only one chamber can form the passageway.

At the junction between the upstream chimney 20 and the corridor 12, the cell 2 is equipped with a series of diverting blades 28. They allow the air coming down the inlet chimney 20 to be discharged along the horizontal direction. The diverting blades 28 extend horizontally, and span the entire corridor 12. They have curved profiles. At the entrance to the corridor 12, in various embodiments, the cell 2 can have a grid 30 making it possible to intercept debris susceptible to perturb the test and damage the turbojet.

The test cell 2 is shown here in normal testing condition, in the usual way. However, in order to take account of the risk of a fire at the turbojet 4, the test cell 2 is equipped with shutters (38, 40). In particular, a first upstream shutter 38 is located upstream of the engine 4, while a second shutter 40 is located downstream. Each shutter (38, 40) has a set of flaps spaced across the passageway 6, and which are distant from each other in the open position.

Figure 2:
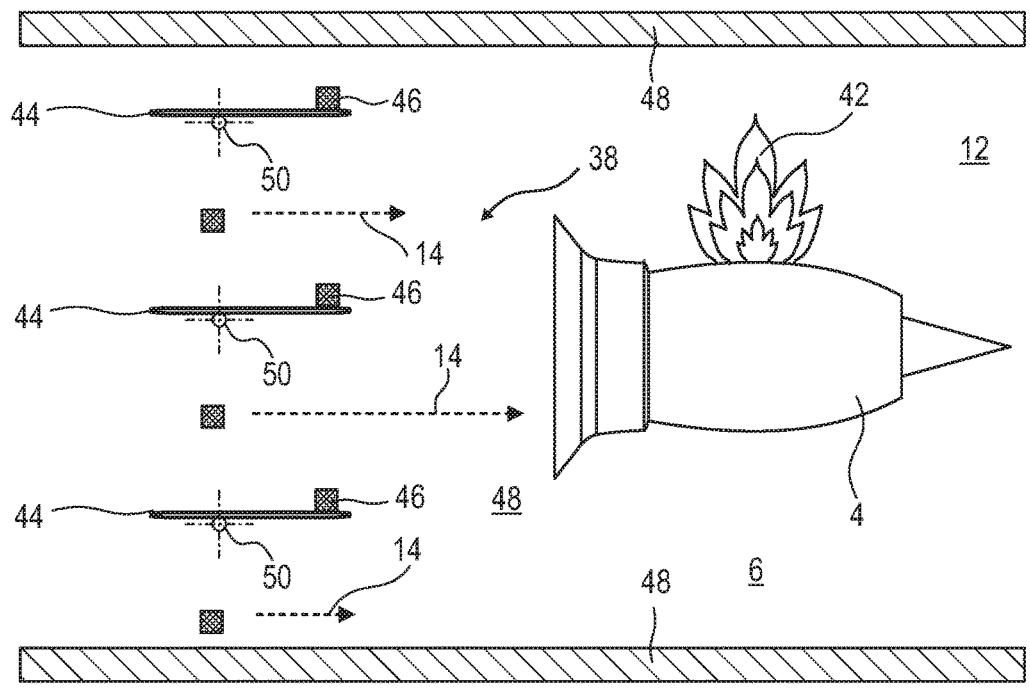
FIG. 2 is a diagram of an upstream shutter in the open position, a fire just having started, according to various embodiments of the invention.

FIG. 2 is a portion of the test cell including the engine 4 and a shutter, for example, the upstream shutter 38. Here, the latter is in the open position. The figure shows a portion of the corridor 12 of the passageway 6. A fire 42 has just started in the engine 4, which corresponds to unusual, abnormal functioning of the test cell.

The shutter 38 includes several flaps 44. The flaps 44 each include a pivot link 50 with a horizontal pivot axis. The flaps 44 are parallel to the same plane and are spaced between each other so as to allow the air flow 14 to pass. 3 flaps are shown here, although any other number can be envisioned, for example, ten or fifteen or twenty on the same shutter 38. The flaps 44 can reveal plate shapes, for example rectangular.

First locking means 46 can hold each shutter in the open position. The flaps 44 can be parallel to the ceiling 48 and to the floor 48 of the corridor 12. The ceiling 48 and the floor 48 form sides delimiting the corridor 12 and hence the passageway 6. They are joined by vertical sides 48, also called lateral sides 48, so as to surround the corridor 12 and hence the passageway 6. The first locking means 46 can be placed on the vertical sides 48. The pivots 50 are located halfway upstream of the flaps 44 so as to assist their tilting when the first locking means 46 are released.

Figure 3:
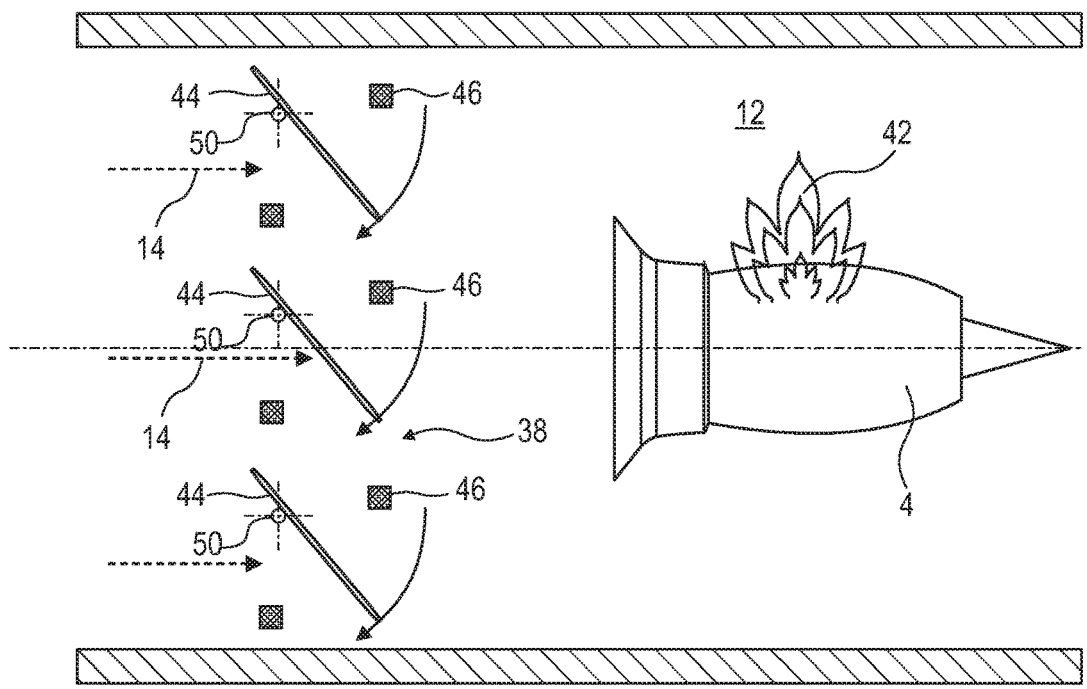
FIG. 3 is a diagram of the upstream shutter in the process of closing, in response to a fire starting, according to various embodiments of the invention.

FIG. 3 illustrates the portion of the test cell of FIG. 2 after the first locking means 46 have been unlocked. In parallel, the engine 4 is shut down.

In response to the detection of the fire 42, the first locking means 46 have released the flaps 44, leaving the latter free. Because of the imbalance between their upstream halves and their downstream halves relative to the respective pivots 50, the flaps 44 tilt. They are inclined compared with the preceding position. Their lower ends come close to the flap 44 below. This pivoting movement occurs under the effect of gravity, this gravitational force forming a return means. The movement of the flaps 44 towards the closed position is therefore free of any energy source. The flaps 44 move autonomously in terms of driving energy. This simplifies the design of the flaps 44 and offers a gain in reliability.

However, the autorotation of the engine 4 continues to drive the air flow 14. The latter exerts a mechanical load against the shutter 38, and in particular against the flaps 44. This mechanical load opposes full closing of the shutter 38, which remains in a partially closed position. The dynamic pressure of the air flow 14 can be used. The flaps 44 remain distanced from each other because they are pushed by the air flow 14. As long as the air flow 14 remains greater than a threshold S, the shutter 38 remains partially open. This threshold S can depend on the balancing of the flaps 44, and/or on their aerodynamic profiles. Elastic return means (not illustrated) can be added or can replace the misalignment of the pivots 50. These elastic means increase the threshold S value.

Figure 4:
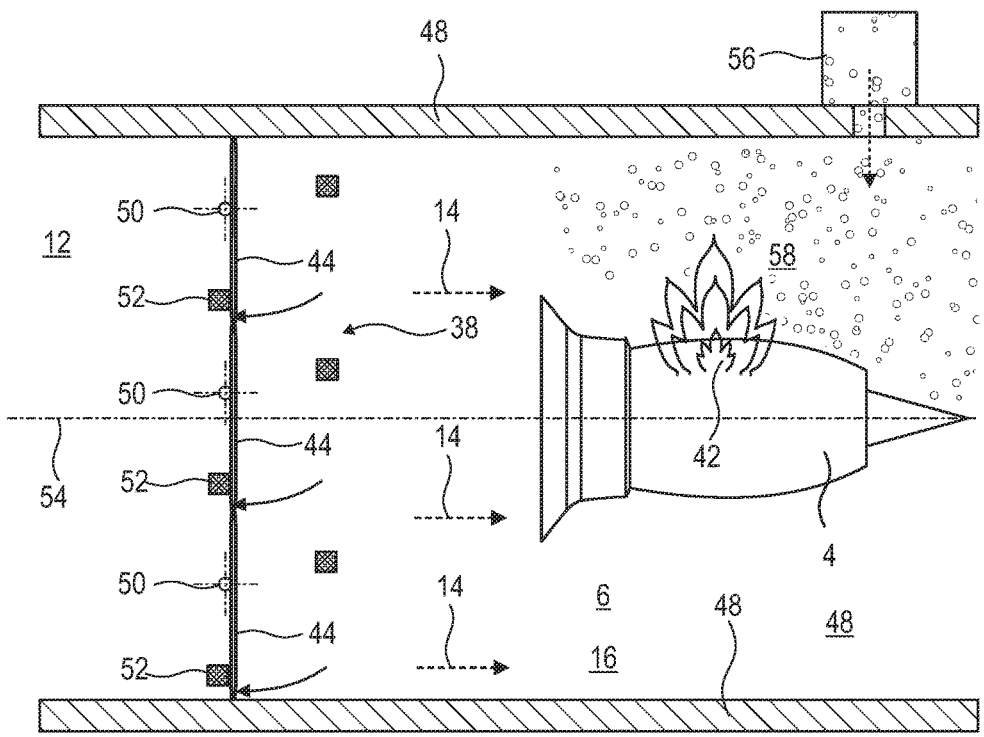
FIG. 4 is a diagram of an upstream shutter in the closed position, according to various embodiments of the invention.

FIG. 4 shows the upstream shutter 38 in the closed configuration. This figure presents the portion of the test cell described with reference to FIGS. 1 to 3.

At present, the air flow 14 is lower than or equal to the threshold S, and so its mechanical load on the shutter 38 is less than the load exerted by the return means. The shutter 38 continues to come down. The flaps 44, each including a pivot link 50, continue to pivot downwards until they come into contact with each other. They can touch each other and possibly push against each other, for example at their upper edges and at their lower edges. Second locking means 52 can hold each flap 44 in the closed position.

The flaps 44 are vertical and form a bulkhead that is both airtight and continuous. They can come into contact with the upper side 48 and with the lower side 48. They can scrape against the vertical sides 48 in an airtight manner. The resulting bulkhead closes the passageway 6 in a generally airtight manner. The circulation of the air flow 14 through the corridor 12 is cut off.

Because the air flow 14 can display a variable distribution depending on the proximity of the sides 48 and the centreline 54 of the corridor 12, the force of the air flow 14 can also vary according to the flaps 44. The flaps 44 can therefore reach their closed positions one after the other. For example, the flaps near the bulkheads can close before those at the centreline of the engine 4, this centreline being able to correspond to the centreline 54 of the corridor 12.

Once confined, the securing area 16 for the engine is made inert. The test cell can include an inerting system 56 able to propel an inert gas 58 into the passageway 6. This fights the fire and allows it to be extinguished.

What has been described in relation to the upstream shutter can also apply to the downstream shutter.

Figure 5:
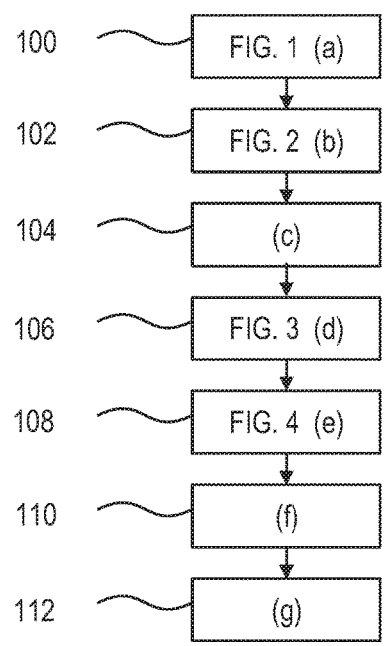
FIG. 5 illustrates a diagram of the fire extinguishing method in a test cell, according to various embodiments of the invention.

FIG. 5 presents a diagram of the method for extinguishing a fire in a test cell, in accordance with various embodiments of the invention. The test cell can be identical to that presented with reference to FIGS. 1 to 4.

The method can take the following steps, in various embodiments, performed in the order that follows:
(a) Performing an engine test 100 in the test cell passageway, each shutter then being in the open position;
(b) detecting 102 of a fire on the engine;
(c) unlocking 104 of the shutters in order to authorize their pivoting;
(d) pivoting 106 of each shutter towards its respective closed position by means of the return means;
(e) shutters in the closed position 108;
(f) locking 110 of the shutters in the closed position;
(g) inerting 112 of the engine area in order to extinguish the fire there.

During step (a) performance of a test 100, the engine can be an aircraft turbojet, able, for example, to create a thrust of at least 120 kN. This thrust results from the air flow being driven through the passageway of the test cell. The air flow exerts a mechanical load against every shutter present in the passageway.

As soon as a fire is detected during step (b) detecting 102, the engine is shut down. It is no longer supplied with energy; namely with fuel. But the inertia of its rotor, combined with its rpm during the test, continue to make its fan turn, and so the air flow continues to be driven through the passageway. As a consequence of which, the shutters continue to be exposed to a thrust linked with the air flow.

During step (d) pivoting 106, each shutter pivots towards its closed position. This movement is driven by the return means. Gravity can allow the shutters to come down. They are then essentially mounted to rotate freely. As a complement or as an alternative, permanent magnets and/or springs can equip the shutters so as to lower the flaps towards the closed position.

Because of the persisting air flow, the closing movement of the shutters is limited. The movement is constrained, and so the shutters remain balanced at a distance from their closed position for as long as the air flow is greater than a threshold S.

During step (d) pivoting, the shutter remains partially open for at least 1 second, for example for at least 5 seconds, for example at least 20 seconds, in various instances for at least 1 minute.

At step (e) shutter(s) in the closed position 108, the air flow has become lower than or equal to the threshold S. From then on, the mechanical action of the return means is sufficiently high to bring each shutter to the closed position. The flow pushed out by the engine is no longer sufficient to move the shutters out of their closed position. The shutters can close, staggered in time.

The shutters can then optionally be locked in place in order to hold them in the closed position during step (f) locking. However, this step is optional. The simple contact between the flaps can be enough to ensure sufficient airtightness. Furthermore, the presence of magnets at the upper and lower ends of the flaps can block them in the closed position. This magnetic action also makes it possible to raise the threshold S.

Once the space accommodating the engine has been confined, that is to say, closed in an airtight manner, it can be made inert. The air therein is no longer replaced. According to another approach, an inert gas is injected there in order to asphyxiate the fire. This pressurized inert gas drives out the remaining oxygen. The oxygen can be aspirated or evacuated by means of a controlled leak through the shutters. Other extinguishing methods are possible, such as sprinkling.

The invention claimed is:

1. A test cell for an engine, said test cell comprising:
an inlet;
an outlet;
a passageway communicating with the inlet and the outlet, the passageway being adapted to accommodate an engine during the tests, the passageway including at least one shutter pivoting at least between an open position and a closed position in order to cut off a circulation of air in the passageway; and
at least one permanent magnet adapted to return the at least one shutter towards the closed position,
wherein the at least one shutter is a first shutter, and the passageway furthermore including a second shutter upstream the first shutter in order to delimit a section of the passageway between them, the first and second shutters being able to cut off the circulation of air between the inlet and the outlet of the passageway so as to be able to stifle a fire in the section.

2. The test cell of claim 1, wherein the at least one shutter includes at least one plate with a width and a thickness, the width being at least ten times greater than the thickness.

3. The test cell of claim 1 further comprising an inerting system able to propel an inert gas into the passageway, and a securing portion for the engine located in a securing area for the engine, the inerting system being placed in the securing area.

4. The test cell of claim 1, wherein the test cell is a test cell for a plane turbojet intended to drive an air flow passing through the passageway, the shutter being able to be moved out of the closed position by the air flow when the air flow is greater than a threshold S, and the shutter is configured so as to be in the closed position when the flow is lower than or equal to the threshold S.

5. The test cell of claim 1, wherein the at least one shutter includes one of a flap and a series of flaps configured to form a continuous bulkhead able to close the passageway with the at least one shutter in the closed position.

6. The test cell of claim 5, wherein, with the at least one shutter in the open position, the one of the flap and each flap is parallel to the main elongation of the passageway.

7. The test cell of claim 5, wherein, with the at least one shutter in the closed position, the one of the flap and each flap is inclined relative to the main elongation of the passageway.

8. A test cell for an engine, said test cell comprising:
an inlet;
an outlet;
a passageway communicating with the inlet and the outlet, the passageway being adapted to accommodate the engine during the tests, the passageway including at least one shutter pivoting at least between an open position and a closed position in order to cut off a circulation of air in the passageway;
locking means for holding the at least one shutter in the open position;
the at least one shutter being arranged in order to be returned to the closed position by the sole action of the gravity force, upon release of the locking means.

9. The test cell of claim 8, wherein the at least one shutter includes a ballast adapted to urge the shutter toward its closed position.

10. The test cell of claim 8, wherein the at least one shutter is able to be moved out of the closed position by an air flow driven by the engine, the air flow generating an opening torque that is opposed to a closing torque generated by the gravity on the shutter.

11. The test cell of claim 8, wherein the at least one shutter includes a pivot link which is off-center relative to the shutter.

12. The test cell of claim 11, wherein, in the closed position, the at least one shutter has an upper half and a lower half, the pivot link being placed at the upper half.

13. A method for extinguishing a fire in a test cell for an engine, wherein the test cell comprises:
an inlet;
an outlet;
a passageway communicating with the inlet and the outlet, the passageway including at least one shutter pivoting at least between an open position and a closed position;
an energetically autonomous return device that is adapted for returning the shutter towards its closed position;
wherein the method comprises:
performing an engine test in the passageway of the test cell;
detecting a fire;
pivoting of the at least one shutter towards the closed position by the return device in an energetically autonomous manner in order to stifle the fire detected.

14. The method of claim 13, wherein the engine is an aircraft turbojet, and wherein following the detecting the fire, the engine is shut down, and wherein during pivoting the at least one shutter, the engine continues to turn so as to drive an air flow that holds the shutter partially open.

15. The method of claim 13, wherein during pivoting the at least one shutter, the at least one shutter remains partially open for at least 1 second.

* * * * *